United States Patent [19]

Kerlin

[11] Patent Number: 5,042,519
[45] Date of Patent: Aug. 27, 1991

[54] FUEL TANK VENT
[75] Inventor: James R. Kerlin, Augusta, Ga.
[73] Assignee: Club Car, Inc., Augusta, Ga.
[21] Appl. No.: 503,602
[22] Filed: Apr. 3, 1990
[51] Int. Cl.[5] .............................................. F16K 17/36
[52] U.S. Cl. ...................................... 137/43; 137/202
[58] Field of Search .................................. 137/202, 43

[56] References Cited
U.S. PATENT DOCUMENTS

| | | | |
|---|---|---|---|
| 1,724,878 | 8/1929 | Jensen . | |
| 2,104,461 | 1/1938 | Holm | 220/44 |
| 2,510,098 | 6/1950 | Geisler | 137/69 |
| 2,935,990 | 5/1960 | Biddle | 137/202 |
| 3,662,725 | 5/1972 | Dragon | 137/202 X |
| 4,325,398 | 4/1982 | Green | 137/39 |
| 4,487,215 | 12/1984 | Green | 137/43 |
| 4,685,584 | 8/1987 | Harris | 220/204 |
| 4,702,268 | 10/1987 | Ambruster et al. | 137/202 |
| 4,735,226 | 4/1988 | Szlaga | 137/43 |
| 4,739,898 | 4/1988 | Brown | 220/203 |
| 4,779,637 | 10/1988 | Ubaldi | 137/43 |
| 4,846,208 | 7/1989 | Hempel et al. | 137/43 |

Primary Examiner—Alan Cohan
Attorney, Agent, or Firm—Nies, Kurz, Bergert & Tamburro

[57] ABSTRACT

A vent valve for use with a liquid-containing tank, particularly a gasoline tank carried by a vehicle that customarily travels over hilly terrain. The valve includes a cylindrical housing, within which a check ball and a float ball are each positioned for limited movement within the housing. The check ball and float ball are adapted to be in contact with each other, and the check ball is movable toward and away from a vent aperture provided at the top of the housing. A plurality of guide ribs are provided interiorly of the housing to confine the movement of the check ball to axial movement toward and away from the vent aperture. The check ball is preferably made from a material that has a specific gravity that is substantially greater than that of the liquid contained in the tank, and the float ball is preferably made from a material and is constructed such that is has a specific gravity substantially less than that of the liquid in the tank. The valve serves to prevent the passage through the valve structure of liquid, but to permit the passage therethough of gases and vapors when the vent is in its normal operating position.

19 Claims, 3 Drawing Sheets

FUEL TANK VENT

BACKGROUND OF THE INVENTION

1. Field of the Invention

This invention relates to venting devices, and more particularly to a vent valve that is installed in a liquid-containing tank, such as a liquid fuel tank, and that is constructed so that it permits the passage therethrough of gases or vapors, but prevents the passage therethrough of liquid from the tank.

2. Description of the Related Art

Venting devices are normally utilized in liquid-containing tanks in order to permit the gas or vapor pressure within the tank to be equalized with the pressure of the surrounding air. The vents function to permit escape into the atmosphere of a sufficient quantity of higher than ambient pressure gas or vapor to lower the internal pressure within the tank, and permit entry into the tank of ambient air when the pressure in the tank is lower than the ambient pressure, to thereby avoid the imposition upon the walls of the tank of the stresses that would otherwise result from expansion and contraction of the gas or vapor within the tank as a result of temperature changes. Additionally, where a tank is provided that is subject to being tilted, such as a liquid fuel tank carried by a vehicle that traverses hilly terrain, some provision must be made to prevent passage of the liquid fuel through the vent valve, in order to reduce the fire hazard and also to reduce hydrocarbon emissions into the atmosphere. An example of a vehicle in which such a venting device is desirable is a gasoline-powered golf cart which is intended to be operated on slopes common to golf courses. During the operation of such golf carts, the vertical axis of the fuel tank is oftentimes tilted as a result of the uneven terrain.

Various types of vent valve structures have been devised to respond to the tilted fuel tank situation referred to above, but most of those solutions have involved complicated, difficult to manufacture, and therefore costly vent valve structures. For example, in U.S. Pat. No. 4,702,268, which issued on Oct. 27, 1987, to Kurt Armbruster et al., there are shown various types of vent valve structures utilizing a plurality of ball-shaped masses for controlling the flow of gases and liquids through the valve.

It is an object of the present invention to provide a vent valve structure for a liquid-containing tank, wherein the vent valve is of simplified construction.

It is another object of the present invention to provide a vent valve structure in which a pair of balls of different size and different weight are provided, one of the balls serving as a valve member to block a vent opening.

It is a still further object of the present invention to provide a vent valve structure that is capable of being made from inexpensive materials and at a low manufacturing cost.

SUMMARY OF THE INVENTION

Briefly stated, in accordance with one aspect of the present invention, a vent valve is provided for permitting the flow therethrough of qases and vapors from a tank, and for preventing the flow therethrough of liquids contained within the tank. The vent valve includes a valve body that has an external mounting arrangement for mounting the body of the valve in the wall of the tank. The valve body includes an interior portion that extends into the interior of the tank, and it also includes an exterior portion that extends outwardly of the tank. A flow passageway extends through the valve body for providing communication between the interior of the tank and the atmosphere external to the tank. The flow passageway includes a reduced area outlet opening that is provided in the exterior portion of the valve body.

First and second balls are positioned within the valve body, the first ball positioned vertically above the second ball and serving for selectively closing the outlet opening. The first ball is adapted to be movable within the flow passageway in the valve body in a direction toward and away from the outlet opening, and it is made from a material that has a specific gravity that is greater than that of the liquid contained within the tank, so that the first ball is incapable of floating in the liquid contained in the tank. Thus, if the tank and vent are inverted, the first ball moves to seal the outlet opening.

The second ball is capable of movement within the flow passageway in the valve body also in a direction toward and away from the vent opening, and it is located on the opposite side of the first ball from the outlet opening. Additionally, the second ball has a specific gravity that is less than the specific gravity of the liquid contained in the tank, so that the second ball floats on the surface of the liquid that reaches the vent valve body. The second ball has a diameter that is greater than the diameter of the first ball, to prevent passage of the first ball around the second ball and thereby maintain the balls in a predetermined relative position with the valve body. An inlet opening is provided in the portion of the valve body that is within the tank, the inlet opening having an area greater than that of the outlet opening, to provide continuous through passageway into the valve body for qases and vapors contained within the tank.

However, when liquid reaches the level of the second, lighter ball, the second ball moves the first ball into sealing contact with the outlet opening, to prevent the passage of liquid through the outlet opening.

A ball retainer element is provided to contain the first and second balls within the valve body. Further, the interior shape of the retainer element provides a ramp to cause the second ball to force the first ball toward the outlet opening when the tank and vent are tilted to the extent the longitudinal axis of the valve has rotated by about 90 degrees or more from the vertical

DESCRIPTION OF THE PREFERRED EMBODIMENTS

Figure 1:
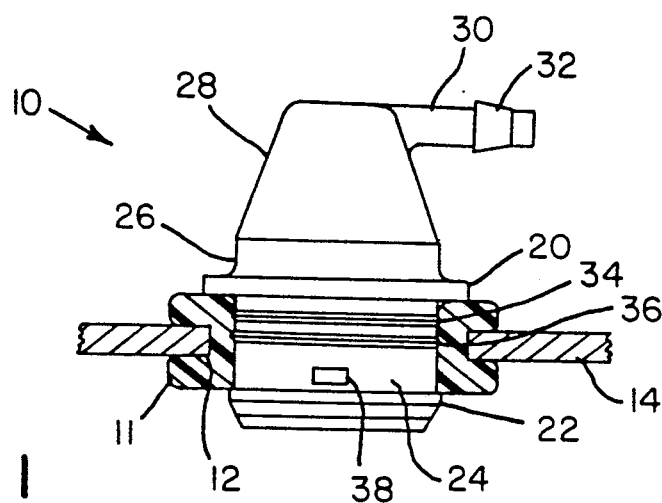
FIG. 1 is an elevational view of a vent valve in accordance with the present invention, shown upright and installed in the wall of a liquid-containing tank.
Figure 2:
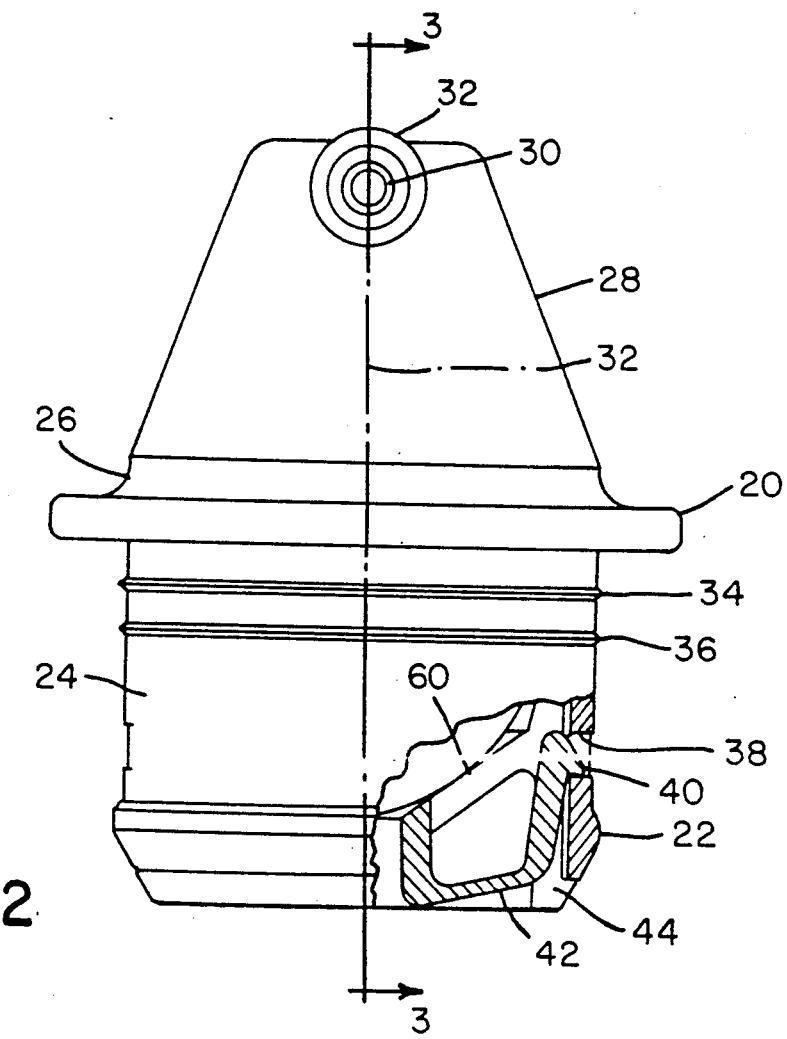
FIG. 2 is a right side view of the vent valve shown in FIG. 1, with a portion of the valve body partially broken away to show part of the interior structure of the valve.

Referring now to the drawings, and particularly to FIGS. 1 and 2 thereof, there is shown a vent valve 10 in accordance with the present invention, as seen from the side and from two perpendicular directions. As shown in FIG. 1, valve 10 is positioned in a grommet 11 of conventional configuration that is sealingly received in an opening 12 formed in the wall 14 of a tank, only a fragment of which is illustrated. Valve 10, which is of circular cross section, is adapted to fit snugly within grommet 11. Valve 10 is so positioned that a portion thereof extends into the interior of the tank a predetermined distance until a radially outwardly extending flange 20 carried by valve 10 is in abutting relationship with the upper surface of grommet 11. Valve 10 includes a circumferential lip 22 that is spaced axially from flange 20 and extends radially outwardly from a cylindrical skirt portion 24 of valve housing 26. The spacing between flange 20 and lip 22 of valve 10 corresponds with the spacing between the upper and lower surfaces of grommet 11 so that cylindrical skirt 24 fits snugly and sealingly within grommet 11 to retain valve 10 in position in tank wall 14.

Valve 10 includes a frustoconical dome 28 that extends upwardly from flange 20 and is exterior to the tank when the valve is in its operative position. Dome 28 includes a vent outlet in the form of a vent tube 30 that extends laterally with respect to valve axis 32. Vent tube 30 includes an enlarged outer ring 32 to permit a vent hose (not shown) to be attached to and retained by valve 10 at the vent tube, to convey the vented gases and vapors a desired distance away from the tank. A pair of outwardly extending circumferential sealing rings 34, 36 are provided on housing skirt 24 to provide additional sealing between the vent body and the inner diameter of grommet 11.

Housing skirt 24 includes a pair of opposed, radially extending slots 38 (one of which is visible in FIG. 1) that are of generally rectangular cross section and are adapted to receive a hook 40 formed at the outer end of a flexible locking finger 42 carried by a ball retainer 44, which serves to define with valve housing 26 a unitary chamber and which also serves to balls that control the venting function of the valve, as will be hereinafter explained in greater detail.

Figure 3:
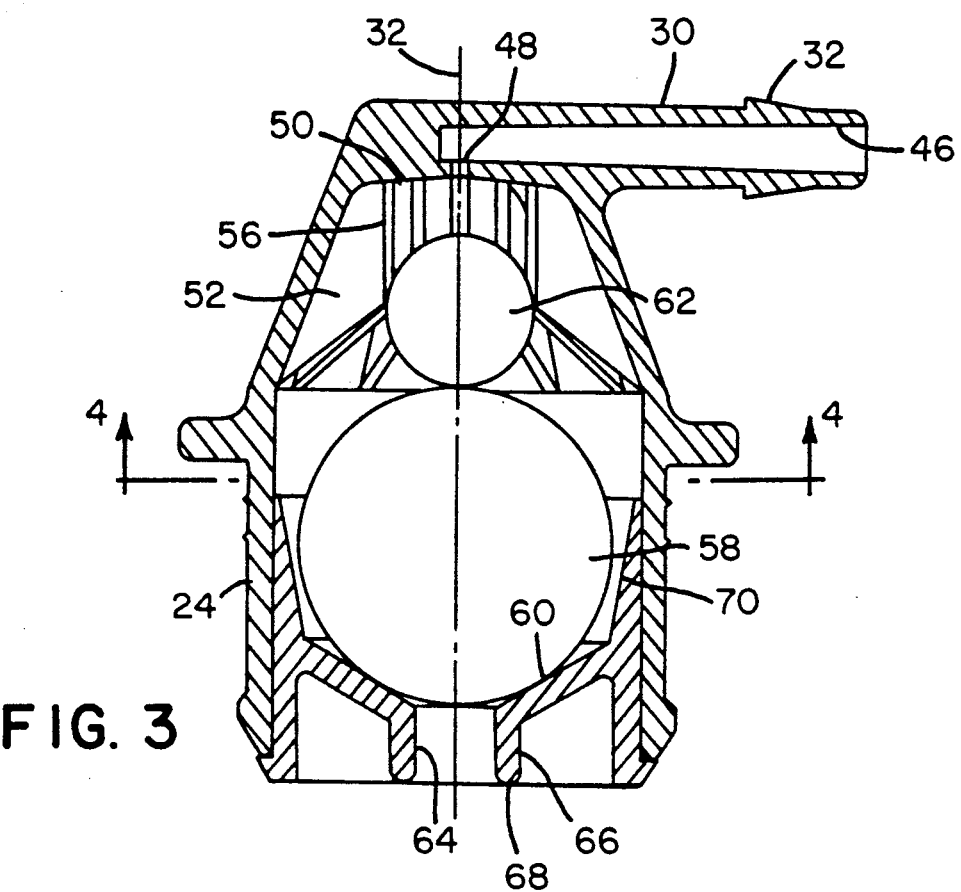
FIG. 3 is a vertical cross-sectional view, taken along the line 3—3 of FIG. 2.

The interior of valve 10 is illustrated in longitudinal cross section in FIG. 3. As there shown, vent tube 30 includes a passageway 46 that extends from the outer end of tube 30 inwardly and terminates adjacent to and communicates with a vent aperture 48 that is provided in the upper wall 50 of frustoconical dome 28. Vent aperture 48 is preferably of a relatively small size and it has its axis coaxial with axis 32 of valve 10.

Figure 4:
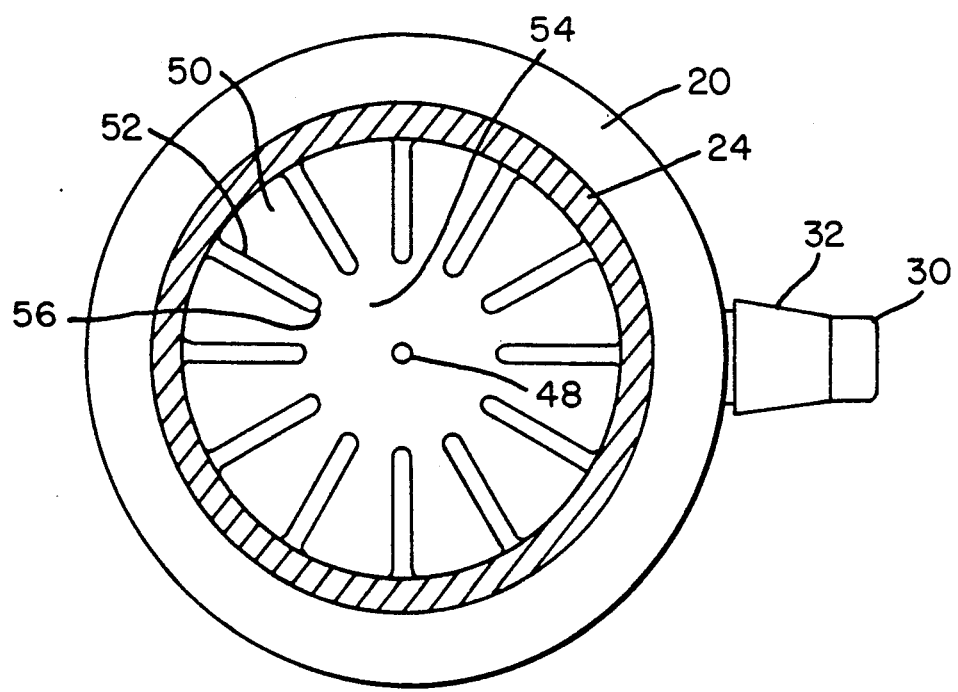
FIG. 4 is a transverse cross-sectional view, taken along the line 4—4 of FIG. 3.

Extending inwardly from the wall defining frustoconical dome 28 are a plurality of radially inwardly extending guide ribs 52 that terminate at a point spaced outwardly from valve axis 32 to define a substantially cylindrical passageway 54 (see FIG. 4) within frustoconical dome 28. As best seen in FIG. 3, each of guide ribs 52 tapers outwardly and downwardly from its respective inner axial edge 56 to merge with the inner wall of frustoconical dome 28 at a point just above external flange 20. Referring to FIG. 4, guide ribs 52 extend radially relative to housing axis 32 and are spaced from each other to define a plurality of passageways to permit communication between vent aperture 48 and the interior of frustoconical dome 28.

Removably secured to housing 26 at the lowermost opening of cylindrical skirt 24 is ball retainer 44, the structure of which will be hereinafter described in greater detail. Retainer 44 serves to partially close the bottom of housing 26, but it does not completely close it off and it permits communication between the interior of the tank and the interior of frustoconical dome 28. Positioned within housing 26 between retainer 44 and vent aperture 48 is a spherical float device in the form of a lower, float ball 58 that is adapted to be in contact with the interior inclined surface 60 of retainer 44 under normal operating conditions when the housing axis is substantially vertical. Positioned between float ball 58 and vent aperture 48 is a spherical flow check device in the form of an upper, check ball 62 that is smaller in diameter than float ball 58 and that is adapted to be received within and to roll along the cylindrical passageway defined by axial edges 56 of guide ribs 52 extending from the internal surface of frustoconical dome 28. Preferably, check ball 62 has a diameter that is slightly less than the diameter of axial passageway 54 defined by guide ribs 52, so that it can move freely in an axial direction relative to housing axis 32. When check ball 62 is in its uppermost position its serves to contact and seal off vent aperture 48, thereby preventing the passage through the aperture of either liquid, gas, or vapor. Additionally, check ball 62 is heavier than float ball 58 and is made from a material that has a specific gravity greater than that of the liquid contained within the tank, so that check ball 62 always will sink when placed in the liquid.

If the liquid in the tank is gasoline, which has a specific gravity of from about 0.70 to about 0.78, the material from which check ball 62 is made preferably has a considerably greater specific gravity, of about 2.85. To provide such a check ball, it has been found that glass, aluminum, or fluorocarbon elastomers are suitable materials.

Float ball 58, as shown, is considerably larger in diameter than check ball 62, and has an effective specific gravity less than that of the liquid in the tank, so that float ball 58 always tends to float on the surface of the liquid. Float ball 58 can be made hollow, and can have a relatively thin wall. When gasoline is the liquid contained within the tank, the construction and material (such as, for example, high density polyethylene) of float ball 58 has a maximum specific gravity of about 0.29.

Figure 5:
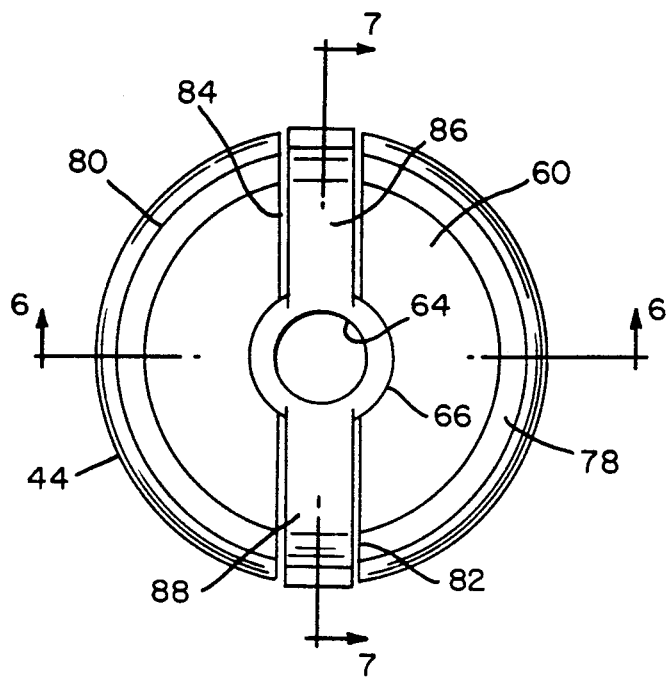
FIG. 5 is a bottom view of a ball retainer element carried within the valve body for retaining the balls in position within the vent valve illustrated in FIGS. 1 through 4.
Figure 6:
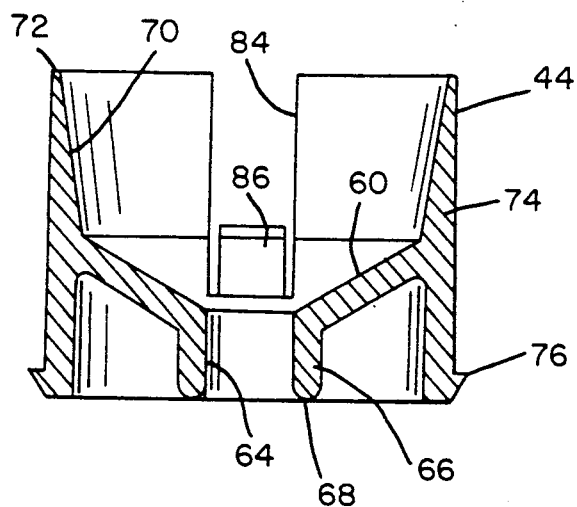
FIG. 6 is a vertical cross-sectional view of the ball retainer element of FIG. 5, taken along the line 6—6 thereof
Figure 7:
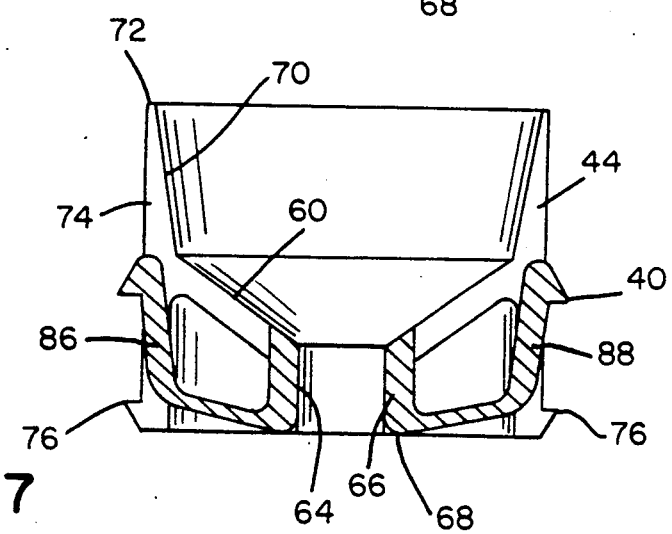
FIG. 7 is another vertical cross-sectional view of the retainer element of FIG. 5, but taken along the line 7—7 thereof, and it right angles to the cross section shown in FIG. 6.

Referring now to FIGS. 5, 6, and 7, which show the structures of ball retainer 44, a vent passageway 64 is provided centrally of the tubular retainer. Passageway is 64 adapted to be substantially coaxial with housing axis 32 and it serves to permit passage of liquid, gas, or vapor from within the tank into the interior of valve housing 26. Passageway 64 is defined by a tubular sleeve 66 that extends axially inwardly from the bottom edge 68 of retainer 44, and it terminates at a steeply tapered, upwardly and outwardly flaring frustoconical float ball seat 60 that defines an angle with the housing axis 32 of about 60 degrees or so. Float ball seat 60 terminates outwardly at a point at which it joins with a shallower tapered frustoconical wall 70 that extends to the top edge 72 of retainer 44. The lowermost portion of side wall 74 of retainer 44 includes a radially outwardly extending positioning flange 76 that abuts the lowermost edge of cylindrical skirt 24 when retainer 44 is in position within housing 26 (see FIG. 3).

Retainer side wall 74, although of generally annular configuration, is discontinuous has a pair of opposed, arc-shaped portions 78, 80 that are spaced from each other to define a pair of opposed, arc-shaped gaps 82, 84, that have a configuration as more clearly seen in FIG. 6. Each of gaps 82, 84 extends in an axial direction along opposite sides of retainer 44. Movably positioned within gaps B2, B4 on either side of retainer 44 are a pair of opposed locking fingers 86, 88 that extend radially outwardly from tubular sleeve 66 and that each include an outwardly axially extending end portion that terminates in a hook 40. Each of hooks 40 is engagable with one of slots 38 provided in cylindrical housing skirt 24, in the manner shown in FIG. 2. As is apparent from FIG. 6, locking fingers 86, 88 are each slightly narrower than respective gaps 84, 82 in retainer side wall 74, and consequently they permit the passage therearound of liquid, gas, or vapor, to provide an additional continuous, unimpeded passageway from the interior of the tank to the interior portion of vent valve 10.

Housing 26 and retainer 44 can be formed of any convenient materials that are compatible with the liquid contained in the tank, and for use in a tank that contains gasoline a suitable material is a molded plastic material.

In operation, when housing axis 32 is in a vertical orientation, the relative positions of check ball 62 and float ball 58 are as illustrated in FIG. 3, with the larger float ball lowermost and the smaller, check ball resting on top of the float ball. When the balls are so positioned, vapor or gas contained within the tank can readily pass around the float ball 58, through axially extending gaps 82, 84 in retainer side wall 44, and also through vent passageway 64 and into the interior of retainer 44. Because float ball 58 has a smaller diameter than the inner diameter of housing 26, the gas or vapor can pass around float ball 58 as well. Furthermore, because check ball 62 is in the position as shown in FIG. 3, the gas or vapor can pass around check ball 62, between guide ribs 52 and out through vent aperture 48 and vent tube 30.

If by chance the tank has been overfilled and the liquid level is higher than the lowermost portion of float ball 58 when the balls are in the position illustrated in FIG. 3, because float ball 58 has a lower specific gravity than the liquid, float ball 58 will be carried upwardly by virtue of the buoyant force provided by the liquid, and float ball 58 will thereby act against check ball 62 to move it axially upwardly between the axially extending edges 56 of guide ribs 52. If check ball 62 is moved upwardly a sufficient distance it will come into contact with and close off vent aperture 48, thereby preventing the outflow of liquid through vent valve 10.

Similarly, if the tank is not quite full but is tipped so that its axis 32 is tilted from the vertical direction for some reason, such as, for example, by virtue of the vehicle traveling up or down a slope, the liquid will again be prevented from passing through vent valve 10 by the same movement of the float and check balls. Additionally, if when under a high liquid level condition the vehicle passes over a bump, the upward movement of the liquid will act against the float ball, pushing it upwardly, again to close vent aperture 48 and prevent the inadvertent discharge of liquid through the vent tube.

If for some unforeseen reason housing axis 32 is at a 90 degree angle relative to the vertical, if the vehicle tips onto its side, float ball 58 will again be pushed by the liquid that enters the vent valve and will roll along tapered surfaces 68 and 70 within retainer 44, to cause check ball 62 to move toward and to close vent aperture 48, thereby again preventing the discharge of liquid through vent tube 30. It can thus be appreciated that the buoyant force of the liquid that causes the float ball to move in the same direction as the direction of liquid movement imparts to float ball 58 motion in a direction wherein one component of that motion is in an axial direction toward vent aperture 48, or along housing axis 32, thereby insuring that float ball 58 pushes against check ball 62 to close vent aperture 48.

Similarly, if the tank or the vehicle in which it is contained is inverted or, if the housing axis is inclined at an angle of between about 90 and about 180 degrees to the vertical, gravity acting on check ball 62 urges it toward aperture 48 because the specific gravity of the check ball is greater than the specific gravity of the liquid.

If for some reason the tank is maintained at an inclined position relative to the vertical for some extended period of time, it is possible that gas or vapor pressure can build up within the tank, such as from the thermal expansion of the liquid within the tank, from an increase in the vapor pressure of the liquid, or both, the vent valve in accordance with the present invention permits the vent to open and to release the pressure buildup when the vehicle returns to its normal orientation with the housing axis positioned substantially vertically.

As will be apparent, the diameters of the check ball and the float ball are so related to the inner surfaces of the housing that the check ball moves only in an axial direction along the edges of the guide ribs, while the float ball can move axially due to buoyant force, or, alternatively, it can move both axially and transversely relative to the housing axis. However, because of the respective steep and shallow tapered ramps defined by inclined inner surfaces 68 and 70, which extend inwardly along the housing to a point substantially opposite to the axial position assumed by the center of float ball 58, the latter has a component of motion such that check ball 62 is moved into contact with and to close vent aperture 48. Thus, it is intended that the balls remain in contact with each other when the tank is tilted to an angle of between 0 and about 90 degrees to the vertical.

It will be apparent that the vent valve structure as hereinabove described and as illustrated in the drawings provides distinct advantages over the prior art vent valve structures, that it is simple in operation and inexpensive in construction, and, additionally, that it satisfactorily functions under a wide range of operating conditions.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A vent valve for permitting the flow therethrough of gases and vapors from a tank and for preventing the flow therethrough of liquid contained within the tank, said valve comprising:
   a) a valve body having an axis and including mounting means for mounting the valve body irma wall of a tank, the valve body including an inlet opening adapted to communicate with the interior of the tank and an outlet opening communicating with the outside of the tank;
   b) flow passageway means within the valve body for providing communication between the valve body inlet opening and the valve body outlet opening;
   c) flow check means positioned within the flow passageway means for movement toward and away from the outlet opening, wherein contact by the check means with the outlet opening closes the opening to prevent flow therethrough, the check means having a specific gravity greater than the specific gravity of a liquid contained within the tank so that the check means is incapable of floating in the liquid contained in the tank, and wherein the flow passageway means includes axially extending guide means adjacent the outlet opening for guiding the check means for movement in an axial direction, relative to the valve body, toward and way from the outlet opening and preventing lateral movement;
   d) float means positioned within the flow passageway means for movement toward and away for the outlet opening and positioned on the opposite side of the check means from the outlet opening, the float means having a specific gravity less than the specific gravity of the liquid contained in the tank so that the float means floats on the surface of the liquid contained within the tank, the float means having a size greater than that of the check means to prevent passage of the check means around the float means; and
   e) the inlet opening having a create area than the at of the outlet opening, wherein each of the check means and the float means is positioned relative to the flow passageway means to permit the passage therearound and through the valve body of gases and vapors and to prevent the passage through the valve body of liquid contained within the tank, and wherein the buoyant force of liquid action on the float means is greater than the force of gravity acting on the float means and on the check means and causes the float means to move toward the check means to move the check means into sealing contact with the outlet opening to prevent the passage of liquid through the outlet opening.

2. A vent valve in accordance with claim 1 wherein the guide means includes a plurality of radially inwardly extending ribs defining an axial passageway for he check means.

3. A vent valve in accordance with claim 2 wherein the ribs include inwardly facing inclined rap surfaces that diverge in an outward direction for the axial passageway.

4. A vent valve in accordance with claim 1 wherein the valve body includes interior inclined ramp surfaces for guiding movement of the float means.

5. A vent valve in accordance with claim 1 wherein the valve body carries retainer means received in the valve body for retaining the check means and the float means within the valve body.

6. A vent valve in accordance with claim 5 wherein the retainer means includes ramp means for guiding movement of the float means.

7. A vent valve in accordance with claim 5 wherein the retainer means includes resilient mounting means for mounting the retainer means in the valve body.

8. A vent valve in accordance with claim 7 wherein the valve body includes a pair of opposed positioning openings and the resilient mounting means includes radially extending flexible fingers having ends received in the positioning openings.

9. A vent valve in accordance with claim 1 wherein the float means is hollow and the check means is solid so that the float means can float on liquid contained within the tank and the check means can sink in liquid that is contained within the tank.

10. A vent valve in accordance with claim 9 wherein the check means has a specific gravity of about 2.85.

11. A vent valve in accordance with claim 9 wherein the float means has a maximum specific gravity of about 0.29.

12. A vent valve in accordance with claim 1 wherein the valve body includes a first body portion adapted to extend into the interior of the tank and a second body portion adapted to extend outwardly of the tank.

13. A vent valve in accordance with claim 1 wherein the check means is a sphere.

14. A vent valve in accordance with claim 1 wherein the float means is a sphere.

15. A vent valve in accordance with claim 1 wherein each of the check means and the float means is a sphere.

16. A vent valve in accordance with claim 15 wherein the sum of the diameters of the spheres is less than the interior axial length of the housing.

17. A vent valve in accordance with claim 15 wherein the check sphere has a smaller diameter than that of the float sphere.

18. A vent valve in accordance with claim 15 wherein the difference between the housing inner diameter adjacent the float sphere and the diameter of the float sphere is less than the diameter of the check sphere.

19. A vent valve in accordance with claim 1 wherein the check means and the float means are each carried in a unitary chamber forming part of the flow passageway means.

* * * * *